United States Patent [19]

Lin et al.

[11] Patent Number: 4,988,123
[45] Date of Patent: Jan. 29, 1991

[54] ERASABLE SYSTEM INCLUDING MARKING SURFACE AND ERASABLE INK COMPOSITION

[75] Inventors: Nan J. Lin, Burlington; Peter G. Hanley, Milford, both of Mass.

[73] Assignee: The Gillette Company, Boston, Mass.

[21] Appl. No.: 287,507

[22] Filed: Dec. 19, 1988

Related U.S. Application Data

[63] Continuation of Ser. No. 906,866, Sep. 15, 1986, abandoned.

[51] Int. Cl.$^5$ .......................... B42D 1/00; B32B 3/00; C09D 11/00
[52] U.S. Cl. .................................. 281/15.1; 428/141; 428/195; 428/207; 428/321.1; 428/321.3; 428/323; 428/327; 428/530; 428/215; 428/498; 428/519; 428/520; 523/161; 525/89; 525/97; 525/99; 524/270; 524/525; 524/505; 106/20;23;25

[58] Field of Search ............... 428/207, 141, 195, 498, 428/321.1, 321.3, 323, 327, 530, 520, 519; 281/15.1

[56] References Cited

U.S. PATENT DOCUMENTS

| | | | |
|---|---|---|---|
| 3,949,132 | 4/1976 | Seregely et al. | 428/207 |
| 4,097,289 | 6/1978 | Hofmann et al. | 106/30 |
| 4,097,290 | 6/1978 | Muller et al. | 106/30 |
| 4,256,494 | 3/1981 | Yamamoto et al. | 106/22 |
| 4,297,260 | 10/1981 | Ferree, Jr. et al. | 523/161 |
| 4,391,927 | 7/1983 | Farmer, III | 524/505 |
| 4,578,117 | 3/1986 | Nakanishi | 106/20 |

*Primary Examiner*—P. C. Sluby
*Attorney, Agent, or Firm*—John P. Morley

[57] ABSTRACT

An erasable system including a marking element providing a non-porous marking surface and an erasable marking composition for applying markings to the marking surface. The erasable marking composition comprises a film forming polymeric material and a colorant. Preferred marking compositions comprise an elastomeric film forming polymeric material.

18 Claims, No Drawings

ERASABLE SYSTEM INCLUDING MARKING SURFACE AND ERASABLE INK COMPOSITION

This application is a continuation, of application Serial No. 906,866, filed Sept. 15, 1986.

BACKGROUND OF THE INVENTION

1. The Field of the Invention

This invention relates to novel, improved erasable systems including a marking element providing a marking surface and erasable marking compositions for applying markings to such surfaces. 2. Description of the Prior Art Erasable systems including a marking element carrying or providing a marking surface and an erasable ink marking composition for applying markings to the marking surface are known to the art. Essentially, such known systems include a marking element comprising a substrate carrying an impervious or substantially non-porous marking surface and an erasable ink marking composition for applying markings to the surface which can be erased from the surface by wiping the surface with a dry eraser such as a cloth or paper tissue. The idealized combination of performance characteristics for known erasable systems has been reasonably well defined. The defined desired combination of performance characteristics for a marking element includes the capability of the marking surface to effectively receive, retain, and display applied marking composition until the received marking is erased from the surface without leaving any significant residual visable evidence of the received marking. Additionally, the desired combination of performance characteristics for marking compositions of erasable systems includes the capability of the marking composition to deposit uniform, visible markings on the surface which can dry rapidly to provide a film or coalesced residue which can be substantially completely erased from the marking surface without leaving any remaining evidence of colorants or other ingredients of the marking comPosition on the surface.

A known erasable system is disclosed in commonly assigned U.S. Patents 3,834,823 and 3,949,132. The erasable system disclosed in these patents includes a marking element carrying a smooth, hard, virtually impervious marking surface such as a hard, plastic surface. The erasable marking composition of the disclosed system is included in a writing instrument having a porous point such as a felt point or a point composed of synthetic or natural fibers bound together to provide capillary channels. Essential ingredients of the erasable marking composition include a release agent having a very low vapor pressure, water, a colorant which is soluble in the water but insoluble in the release agent and a silicone surfactant which is soluble in the marking composition. Additional ingredients- which may be included in the marking composition are a water-soluble wax and a water-miscible organic solvent.

In practice, the marking composition is applied to the marking surface and during evaporation of the aqueous or partially aqueous solvent, the release agent comes out of solution to form a film on the marking surface. Accordingly, on drying, the trace or line provided by the marking composition includes colorants which are insoluble in the release agent, and the colorants lie on top of the thin film of release agent. In this way, the film of release agent provides a barrier between the film and the marking surface !: so that the film can be erased from the surface without leaving any residual visible evidence of the marking on the surface.

U.S. Patent 3,563,782 describes another known erasable system in which the marking surface is the surface of a pigmented plastic substrate, and the erasable marking composition consists of a dispersion of dye particles in a solvent having a low surface tension. The marking composition is applied to the marking surface, and after evaporation of the solvent, an erasable, non-continuous film is provided on the marking surface and the film includes discrete, closely spaced dye particles The non-continuous film of dye particles can be erased from the marking surface by wiping the film with a cloth or soft paper.

The erasable systems described above are especially, adaptable for use as substitutes for blackboards, and the marking elements usually takes the form of a relatively large panel. Moreover, the markings provided on the marking surface of the above-described erasable systems have little rub resistance so that the markings can be completely erased from the surface by a dry cloth or felt eraser to provide a clean marking surface on the marking element. Known erasable systems Providing markings on a marking surface having good rub resistance require cloths or paper wet with water or solvent to effectively remove such markings and provide a clean surface for new markings. The use of wet cloths or paper obviously complicates the achievement of a clean surface for new markings.

Additionally, known erasable systems are not so easily or readily adaptable for use in office or desk paraphernalia such as daily calendars or desk notebooks designed to record appointments, schedules, accounts, or similar notations An erasable system for use in such paraphernalia requires significantly different performance characteristics from those required for erasable systems used as substitutes for blackboards. For example, such paraphernalia is normally designed for individuals for recording desired notations useful to the individual Accordingly, the size of the marking element needed is relatively small, and preferably, the element should be relatively flexible and have qualities and properties more closely corresponding to paper rather than to plastics. Moreover, the marking composition should be capable of reliably providing legible markings in relatively small areas of the marking surface. Also, the markings should have sufficient rub resistance so that they are not inadvertently erased such as by accidental rubbing or wiping or abrasion of the surface. The degree of rub resistance of the marking is particularly important in such paraphernalia involving a plurality of marking elements superposed on each other and where one or more of the elements has erasable markings on the marking surface. Ideally, the marking should be mechanically erasable by an elastomeric eraser rather than by a cloth or paper or the like. In this way, the marking can be effectively retained on the marking surface until it is no longer needed, and markings in selected areas can be completely and neatly erased without affecting markings in non-selected areas.

The present invention presents to the art novel, improved erasable systems having an especially deslable combination of performance characteristics which provide sufficient flexibility and latitude so that the systems are adapTable for use as a substitute for blackboards and also are especially adaptable for providing the above-described desk or office paraphernalia.

BRIEF SUMMARY OF THE INVENTION

The novel, improved erasable sysTems of this invention include a marking element providing a substantially non-porous surface and an erasable marking composition comprising a dispersion of a film-forming polymeric material(s) and a colorant(s). In the preferred practise of the invention, the erasable marking composition provides markings on the marking surface which are completely erasable by an elastomeric eraser.

DESCRIPTION OF THE PREFERRED EMBODIMENTS

The presently contemplated preferred erasable systems of the invention comprise a marking element Providing a substantially non-porous marking surface and an erasable marking composition comprising a dispersion of a film-forming Polymeric material and a colorant. The substantially non-porous surface of marking elements of the invention has a nitrogen gas permeability of less than about 1000cc/(mm$^2$·mm thickness), 24h as measured by ASTM procedure D1434. Preferred marking elements have a nitrogen gas permeability of less than about 250cc/(mm$^2$·mm thickness), 24h. Suitable non-porous surfaces can be provided by ceramic, metal or glass but non-porous surfaces provided by polymeric materials are preferred. Suitable polymeric materials include polyethylenes, polypropylenes, polyvinyl chlorides, polyesters, polyethers, polyvinylacetates, polystyrenes, cellulosics such as, cellulose acetates, ethyl cellulose, cellulose acetate butyrate, cellulose propionate, cellulose triacetate and polyacrylates among others. The marking element may be a polymeric sheet material which may or may not be pigmented or otherwise colored or treated to provide a non-porous surface having a desired texture or surface reflective characteristics. Alternatively, marking elements of the invention can include substrates carrying layers or films or coatings of the above-mentioned polymeric materials or other polymeric materials capable of providing a substantially non-porous surface. Preferred marking elements comprise sheets of cellulusics, polyesters, polyethylenes, polypropylenes and polystyrenes having a thickness no greater than about 10 mils laminated to a paper substrate having a thickness no greater than about 100 mils.

Erasable marking compositions of erasable systems of the present invention comprise a dispersion of a colorant and a film-forming polymeric material which can form a substantially water insoluble film on drying. Broadly the preferred film-forming polymeric materials useful in the practice of this invention are elastomeric polymeric materials which are substantially soluble in organic or partially organic solvent systems. Erasable marking compositions containing elastomeric, film-forming plastomeric materials are known and generally include natural or synthetic elastomeric materials dispersed in an organic form. Especially preferred erasable marking compositions for use in the present invention are described in commonly owned U.S. Patents, 4,097,290; 4,389,499; 4,390,646 and 4,391,927. The compositions of U.S. Patent 4,097,290 comPrise natural rubber or synthetic elastomers essentially or substantially duplicating the structure of natural rubber dispersed in a solvent system including low and high boiling organic solvents. Erasable marking compositions of U.S. Patents 4,389,499; 4.390,646 and 4,391,927 comprise solvent dispersions of styrene containing block copolymers. The above commonly owned patents are expressly incorporated herein by reference. Other representative erasable marking compositions suitable in the practice of the present invention are described in U.S. Patents 3 875,105; 4,256,494; 4,329,262; 4,329,264; 4,349,639; 4,379,86/; 4,525,216 and in Japanese Patent Application No. 153746/79 and in European Patent Application No. 81900078.7. Erasable marking compositions described in the above patents and applications include such elastomeric film forming polymeric materials as polyisoprenes, lower alkyl vinyl ethers, polyvinyl butyrals, vinyl chloride/vinyl acetate copolymers, vinylidene chloride/acrylonitrile copolymers, ethyl and acetyl polymers, vinyl chlorides, polyisobutylenes, ethylene-propylene copolymers and polynorbanes among others. The above patents and applications further describe representative ingredients and concentrations of ingredients such as solvents or solvent systems, colorants, plasticizers, stabilizers and lubricants and the like included in marking compositions suitable in the practise of the present invention.

Representative preferred marking compositions of the type disclosed in U.S. Patent 4,097,290 comprise from about 15 to about 45 percent by weight of the total weight of the composition of the elastomeric film-forming material dispersed in a mixture of low and : high boiling organic solvents and where the low boiling solvent is present in an amount between about 15 to about 50 percent by weight and the high boiling solvent is present in an amount between about 15 to about 35 percent by weight. Additionally, the compositions include from about 12 to about 30 percent by weight colorant and from about 2 to about 8 percent by weight lubricant. Representative preferred marking compositions of the type disclosed in U.S. Patents 4,389,499; 4,390,646 and 4,391,927 comprise from about 10 to about 30 percent by weight of the elastomeric styrene containing copolymer(s), from about 15 to about 40 percent by weight solvent, from about 5 to about 35 percent by weight plasticizer and from about 2 to about 20 percent by weight colorant. Preferably the compositions also include from about 1 to about 10 percent by weight polybutene and from about 1 to about 10 percent by weight poly-alpha-methylstyrene.

Colorants useful in marking compositions of erasable systems of &he present invention are those which are substantially water insoluble when the erasable film of polymeric particles and colorant is dry. Accordingly, suitable colorants include water-insoluble colorants or colorants which can be rendered water insoluble upon drying by chemical and/or physical mechanisms or colorants which can be rendered water insoluble by reason of a physical and/or chemical retention mechanism existing between the polymeric particles and colorants of the erasable flim. Suitable specific colorants include commerically available colorants such as COLANYL BLUE A2R (American Hoechst), ECCOBRITE BLUE (Eastern Chemical), PIGMENT BLUE 1 (BASF Wyandotte) and PIGMENT BLUE 15 (BASF Wyandotte) among others. Preferred amounts of the above colorants include amounts between about 0.1 to about 40 percent by weight colorant(s) based on the total weight of the marking composition and especially preferred amounts are between about 0.3 to about 25 percent by weight.

Other ingredients, which may be included in the marking compositions of the invention, are antioxidants, corrosion inhibitors, wetting agents and stabilizers, among others. The amount of any of the other above ingredients added to the marking composition can vary and will primarily dePend upon the degree of efficacy desired from the added ingredienT However, such amounts can be readily determined by those skilled in the art.

Erasable marking compositions described in the patents and, applications listed before provide a transitory degree of erasability when applied to a porous surface such as a paper surface. When the compositions are applied to a porous surface, the composition dries—usually within a minute or less - to provide a visible marking comprising a substantially dry coalesced film or residue. For about two or three days, the film marking can be substantially completely erased from the surface by using an elastomeric eraser. After that period however, the marking can no longer be erased without intensive rubbing and removal of portions of the surface carrying the marking and/or without leaving visible residual evidence of the marking on the surface. The transitory erasability of the film marking is believed to be a result of two mechanisms. The first mechanism involves the permeation and penetration of pigment and solvent of the applied composition into the pores of the surface carrying the marking. This mechanism results in staining of the porous surface and bonding of the marking to the surface. The second mechanism involves an oxidation or curing of the film which results in increased hardness and tenacity of the film marking and may also contribute to the bonding of the marking to the surface.

The marking elements of the present invention have non-porous surfaces and the non-porous surfaces markedly extend the erasability of the erasable marking compositions described above. Depending upon the degree of exposure to ambient light, film markings provided by the marking compositions can be completely and : easily erased from the surfaces over time Periods extending from about two weeks to about six months. For example, a marking provided by the composition and constantly exposed to ambient light for two weeks can be completely erased from the surface by relatively mild rubbing with an elastomeric eraser. Thereafter, the marking can be completely erased from the surface but the intensity of rubbing required increases. Complete erasure of the marking after constant exposure to ambienT light for about four weeks is possible but difficult. On the other hand, markings which are not exposed to any ambient light can be completely and easily erased from the surfaces with mild rubbing by an elastomeric eraser after six months. Since the preferred embodiment of the invention contemplates the arrangement of a plurality of superposed marking elements as pages in a desk appointment book or calendar, the intermittent occasions of exposure of the markings to ambient light will be minimal. Accordingly, the estimated time period of erasability of markings applied to the pages is between at least about two to about five or six months.

Illustrative Example I below describes a marking composition representative of preferred marking compositions for erasable systems of the present invention.

EXAMPLE I

The following is an erasable ink composition of the type disclosed in the before mentioned U.S. Patent 4,097 290 and is representative of preferred erasable ink compositions in the practise of the present invention:

| Ingredient | Percent By Weight |
|---|---|
| Naphtha | 26.53 |
| Lauric Acid | 1.39 |
| Stearic Acid | 0.46 |
| Natural Rubber | 21.62 |
| Pigment Blue 15 | 7.1 |
| Pigment Blue 1 | 15.8 |
| Dioctyl Phthalate (DOP) | 27.1 |

EXAMPLE 2

A marking element of the invention was prepared by laminating MYLAR polyester films (0.5 mil) to both surfaces of a sheet of 60 lb. Hammermill paper using a polyvinyl acetate (GELVA TS-100) binder. Commercially available cellulosic films which can also provide suitable non-porous surfaces For markers of the present invention include FORTICEL cellulosic films and KODACELL cellulosic films sold by Celanese Plastics Company and Eastman Kodak Company respectively. Suitable commercially available polyester films include CELANAR polyester films and SCOTCHPAK polyester films sold by Celanese Plastics company and Minnesota Mining and Manufacturing Company respectively.

The marking composition of Example 1 was applied to the marking element of Example 2 by way of a ballpoint pen. The marking composition dried in twenty seconds or less and provided a marking comprising a continuous, coalesced residue or film which was easily legible and had substantially uniform color, dimensions and line quality. The film provided by the marking composition had excellent rub resistance and could not be removed or erased from the marking surface by accidental rubbing such as might occur by rubbing another marking element against the film or by lightly rubbing the film with a cloth. However, the film could be completely erased by an elastomeric eraser without leaving any residual visible evidence of the erased marking and without any detectable damage to the surface carrying the marking.

In the broadest aspects of the invention's use, the size and shape of the marking element can vary over a wide range, and the marking composition can be applied to the surface of the marking in any suitable manner. For examPle, the marking composition can be applied to the surface by a brush, pen or even by the fingers if desired. For about two weeks after the marking composition has been applied to the surface, the film providing the marking can be completely removed or erased from the surface by the use of an elastomeric eraser or by energetic rubbing of the film with a dry cloth or paper or a dry brush or sponge. The intensity of the rubbing needed to remove the film by a cloth or paper or brush or sponge increases with the time the film remains on the marking surface. Within the first two or three hours after the film is applied to the surface, the intensity of rubbing needed is relatively mild, but after a few hours, the intensity of rubbing needed progressively increases. After about one week, complete removal or erasure of the film is most effectively achieved by the use of an elastomeric eraser.

As mentioned, in the preferred embodiments of the invention, the erasable system is used to Provide office paraphernalia such as daily calendars or aPpointment books. When used in such applications, the marking element of the system can take the form of a book including a plurality of pages of marking elements bound between covers with each page having blocks or lines and other printed indicia all arranged and integrated in a manner designed to effectively record information needed by the user. In this preferred application, the marking composition is stored in a conventional ball-point pen which included an elastomeric eraser so that cancelled appointments or schedules can be erased and be replaced by other appointments or schedules. Preferably, means such as magnets or clips are used to retain the ball-point pen in close proximity to the calendar or appointment or schedule book.

From the above description, it should be apparent that the invention presents to the art novel, improved erasable systems having an especially desirable combination of performance characteristics. The combination of performance characteristics provides a wide latitude of applications .or the erasable systems. They can be used as effective substitutes for blackboards since the marking composition provides erasable markings which can be completely removed by rubbing with a cloth or brush within a short time after the application of the marking. Alternatively, the markings can be erased by an elastomeric eraser after an extended period of time such as up to about six months. The erasable systems are especially adaptable for use as office paraphernalia such as appointment books or daily calendars. In such applications, the marking composition is included in a ball-point pen, and the marking element takes the form of pages of a book. The individual user can easily write needed information on selected areas of the pages and later can easily and completely remove written information from selected areas of the page and substitute other information in the selected area without affecting information in other areas of the page. Accordingly, the novel, improved erasable systems of the present invention provide distinctive, unexpected advantages and benefits over erasable systems known to the art at the time the Present invention was made.

We claim:

1. An erasable system comprising a marking element and an erasable marking composition for applying markings to the marking element, said marking element comprising a plurality of superposed sheets bound in the form of a book, each sheet having a substantially non-porous marking surface, said marking composition consisting essentially of a dispersion of an elastomeric film-forming polymeric material selected from the group consisting of natural rubbers, synthetic elastomers essentially duplicating the structure of natural rubbers, styrene-containing block copolymers and mixtures of these and a colorant in an organic solvent system, said marking composition providing an erasable, coalesced residue on drying which is substantially water insoluble and which is erasable by an elastomeric eraser.

2. A system of claim 1 where the substantially non-porous surface is provided by a polymeric material.

3. A system of claim 1 where the substantially non-porous surface is provided by a polymeric material selected from the group consisting of cellulosics, polyesters, polyethylenes, polypropylenes, polystyrenes, or mixtures of these.

4. A system of claim 1 where each sheet comprises a layer of polymeric material carried by a substrate.

5. A system of claim 4 where the thickness of the layer is between about 0.1 to about 10 mils.

6. A system of claim 5 where the substrate is paper.

7. A system of claim 6 where the paper has a thickness between about 1 to about 100 mils.

8. A system of claim 7 where the layer of polymeric material is selected from the group consisting of cellulosics, polyesters, polyethylenes, polypropylenes, polystyrenes, or mixtures of these.

9. A system of claim 1 where the elastomeric film-forming polymeric material is a natural rubber.

10. A system of claim 1 where the erasable marking composition is retained in a ball-point pen.

11. A marking element comprising a plurality of superposed sheets bound in the form of a book, each sheet having a substantially non-porous surface carrying a dry, substantially water-insoluble erasable coalesced residue of a marking composition consisting essentially of an elastomeric film-forming polymeric material selected from the group consisting of natural rubbers, synthetic elastomers essentially duplicating the structure of natural rubbers, styrene-containing block copolymers and mixtures of these and a colorant dispersed in an organic solvent system said coalesced residue being erasable by an elastomeric eraser.

12. A marking element of claim 11 where the substantially non-porous surface is provided by a polymeric material.

13. A marking element of claim 11 where the substantially non-porous surface is provided by a polymeric material selected from the group consisting of cellulosics, polyesters, polyethylenes, polypropylenes, polystyrenes, or mixtures of these.

14. A marking element of claim 11 where each sheet comprises a layer of polymeric material carried by a substrate.

15. A marking element of claim 14 where the thickness of the layer is between about 0.1 to about 10 mils.

16. A marking element of claim 15 where the substrate is paper.

17. A marking element of claim 16 where the paper has a thickness between about 1 to about 100 mils.

18. A marking element of claim 11 where the elastomeric polymeric material is a natural rubber.

* * * * *